July 30, 1940.　　　　G. F. RUOPP　　　　2,209,539

PRESSURE GAUGE

Filed May 20, 1938

Inventor
George F. Ruopp.
by Owing & Hague, Attys

Patented July 30, 1940

2,209,539

UNITED STATES PATENT OFFICE 2,209,539

PRESSURE GAUGE

George Frederick Ruopp, Marshalltown, Iowa, assignor to Marshalltown Manufacturing Company, Marshalltown, Iowa, a corporation of Iowa Application May 20, 1938, Serial No. 209,044

2 Claims. (Cl. 73—109)

In the use of steam boilers it sometimes happens, due to the carelessness of the operator, that the steam pressure is permitted to rise above the safety limit of the boiler, resulting sometimes in damaging strains and stresses upon the boiler, and sometimes in boiler explosions. The steam gauges in general use are provided with pressure indicating hands which visually indicate the boiler pressure at the moment and return to zero as the pressure is relieved. When boilers are subjected to such objectionable pressures it is sometimes desirable to determine with accuracy the amount of such excessive pressure.

The object of my invention is to provide means in the nature of an accessory to an ordinary steam gauge for permanently recording the maximum pressure to which a boiler has been subjected, and to place such record in such position as to conceal it from the operator and to prevent the operator from manipulating the gauge in a manner to destroy the record, and at the same time provide means whereby upon the breaking of a seal such record may be seen.

In the accompanying drawing Figure 1 shows a rear elevation of my improved pressure gauge with the casing removed;

Figure 4:
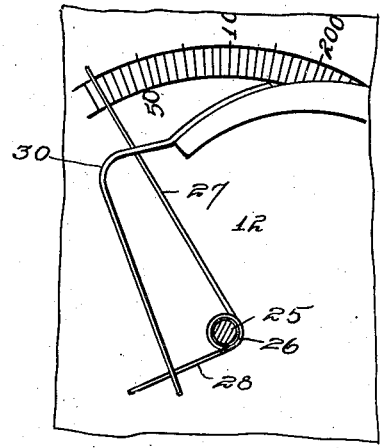
Figure 4 shows a detail side elevation illustrating the permanently recording indicator hand and the means for operating it from the Bourdon tube.
Figure 2:
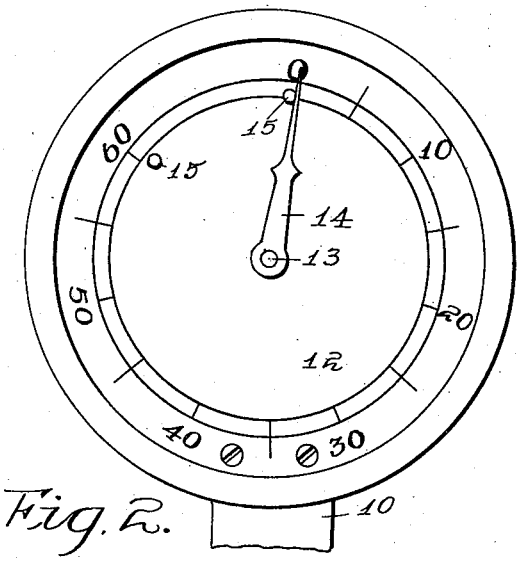
Figure 2 shows a front elevation of the same with the casing in position and sealed.
Figure 1:
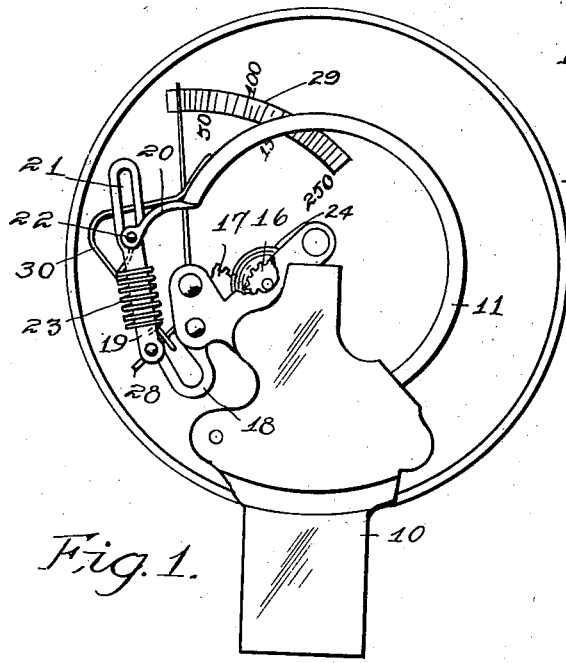
Figure 3:
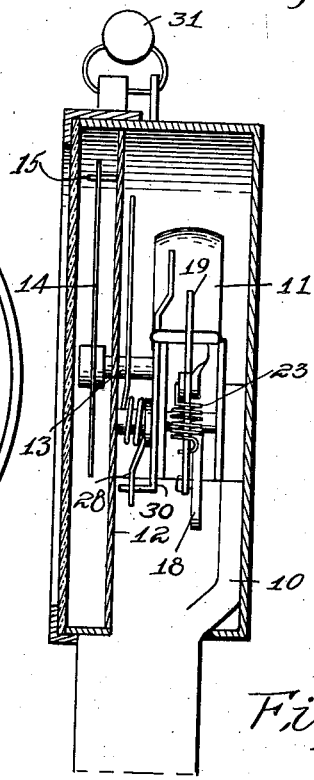
Figure 3 shows a vertical central sectional view of my improved gauge with the casing removed.

My invention is in the nature of an attachment for an ordinary Bourdon tube pressure gauge, and it comprises a main frame 10 to which the Bourdon tube 11 is attached in the ordinary manner. The dial is indicated by the numeral 12, and in it there is mounted a rotatable shaft 13 having the main indicating hand 14 fixed at its end in front of the dial. The dial is provided with the usual scale and with a pin 15 for limiting the movement of the indicating hand.

Fixed to the shaft 13 is a pinion 16, and a sector 17 is in mesh with the pinion and carried by a lever 18 pivotally supported. This lever is connected by a link 19 with an arm 20 fixed to the Bourdon tube. This link is provided with a slot 21, and a pin 22 is extended through this slot and fixed to the arm 20. A contractible spring 23 is attached to the pin 22 and to the link 19 to normally hold the pin 22 at the lower end of the slot 21. A hair spring 24, of the usual construction, is applied to said shaft 13 for normally returning it so that the indicating hand will point to the first mark on the dial when pressure upon the Bourdon tube is relieved.

With the construction before described, the pressure gauge works in the usual manner of gauges of this kind, and when the indicating hand reaches its limit of movement and engages the pin 15, then upon increased expansion of the Bourdon tube the pivot pin 22 may move upwardly in the slot 21 to permit such movement of the Bourdon tube and without affecting the other parts of the gauge, and when the excessive pressure is relieved from the Bourdon tube, the spring 23 will return the pin 22 to the lower end of the slot 21.

For the purpose of making a permanent record of pressures within the Bourdon tube in excess of the amount which the gauge is normally intended to indicate, I have provided the following: On the back of the dial is a pin 25, and coiled around this pin is a spring 26, the ends of which coil engage the rear face of the dial and the adjacent portions of the frame so that the spring will be frictionally held in any position in which it may be adjusted. One end of this spring is formed into an indicating hand 27, and the other end is formed into a laterally extending arm 28. On the rear face of the dial is a scale 29 to cooperate with the indicating hand 27, and this scale is arranged to record much greater pressures than the scale on the front of the dial.

For operating the indicating arm 27 I have fixed to the Bourdon tube an arm 30, which is extended downwardly and then outwardly under the arm 28 so that as the arm 30 moves upwardly to the position shown in Figure 4, the arm 28 will also be moved upwardly and the indicating hand 27 moved toward the right, and when the Bourdon tube contracts, the arm 30 may move downwardly without in any way affecting the arm 28 or change the position of the indicating hand.

In order to move the Bourdon tube to the position of the maximum movement of the indicating hand 27 it is, of course, necessary to move it much further than that in which it is normally moved for operating the indicating hand at the front of the dial, but by providing the sliding connection, consisting of the pin 22, slot 21 and the spring 23, this additional movement of the Bourdon tube will have no effect upon the mechanism of the gauge in normal use.

The casing is preferably provided with a seal 31 which, before the back can be removed, must be broken. Hence, an operator cannot at any time determine the position of the indicating hand at the back of the dial without first breaking the seal and thereby indicating that the gauge has been tampered with.

In practical use the pressure gauge and the indicating hand at the front of the dial operate in the ordinary manner. When, however, excessive pressures are applied to the Bourdon tube, the sealed indicating hand is moved to position for making a permanent record of such excessive pressure, and when such excessive pressures occur, the mechanism for operating the indicating hand at the front of the dial is not in any way injured or strained, on account of the sliding connection and spring 23. However, the concealed indicating hand is, under such conditions, moved to indicate the maximum of such excessive pressure, and is there retained by its spring 26, and when it is desired to determine whether or not pressure has been raised at any time above the danger point, then the seal may be broken, the cover removed, and the maximum amount of pressure to which the gauge has been subjected will be shown by the indicator hand 27 on the scale 29.

I claim as my invention:

1. A pressure gauge, comprising a casing, a Bourdon tube, an indicating hand visible from the exterior of the casing, means operated by the expansion of the Bourdon tube for operating said indicating hand, means for limiting the movement of the indicating hand, a second indicating hand located at a normally concealed portion of the casing, means operatively connected with the Bourdon tube for moving said second indicating hand in the direction for indicating the maximum movement of the Bourdon tube, means for yieldingly holding said second indicating hand against return movement, said means operated by the expansion of the Bourdon tube for operating the first indicating hand comprising a sliding connection and a spring for yieldingly holding said sliding connection at one limit of its movement and permitting movement in the opposite direction when the indicating hand has reached the limit of its movement and upon further expansion of the Bourdon tube whereby the second indicating hand is caused to move to register a greater pressure.

2. A pressure gauge, comprising a casing, a pressure expansible member, an indicating hand visible from the exterior of the casing, means for limiting the movement of the indicating hand means operated by the expansion of the pressure expansible member for operating said indicating hand, a second indicating hand located at a normally concealed portion of the casing, means operatively connected with the pressure expansible member for moving said second indicating hand in the direction for indicating the maximum movement of the pressure expansible member, means for yieldingly holding said second indicating hand against return movement, said means operated by the expansion of the pressure expansible member for operating the first indicating hand, comprising a sliding connection and a spring for yieldingly holding said sliding connection at one limit of its movement and permitting movement in the opposite direction when the indicating hand has reached the limit of its movement and upon further expansion of the pressure expansible member whereby the second indicating hand is caused to move to register a greater pressure.

GEORGE FREDERICK RUOPP.